United States Patent [19]
Limberg

[11] 4,139,419
[45] Feb. 13, 1979

[54] ARRANGEMENT FOR DOSING A COAL CHARGE TO A COKING BATTERY

[75] Inventor: Jaroslav Limberg, Prague, Czechoslovakia

[73] Assignee: Hutni projekt Praha, projekcni a inzenyrska organizace, Prague, Czechoslovakia

[21] Appl. No.: 760,986

[22] Filed: Jan. 21, 1977

[30] Foreign Application Priority Data

Jan. 21, 1976 [CS] Czechoslovakia .................... 370/76

[51] Int. Cl.² .................... B65G 65/30; C10B 31/00; F26B 17/00
[52] U.S. Cl. .................... 202/262; 34/57 A; 202/133; 214/18 R; 214/35 R; 201/40; 201/41
[58] Field of Search ............. 202/133, 262; 214/18 R, 214/18 V, 35 R; 432/14, 15, 16, 58; 34/10, 57 A; 201/40, 41

[56] References Cited

U.S. PATENT DOCUMENTS

| | | | |
|---|---|---|---|
| 1,867,841 | 7/1932 | Joseph | 23/288 B |
| 3,151,944 | 10/1964 | Stevens | 23/288 B |
| 3,337,417 | 8/1967 | Albright | 201/31 |
| 3,436,314 | 4/1969 | Leonor | 201/25 X |
| 3,457,141 | 7/1969 | Schmidt | 201/40 X |
| 3,599,885 | 8/1971 | Alderman et al. | 34/10 X |
| 3,862,294 | 1/1975 | Engelhart et al. | 432/14 X |
| 3,951,750 | 4/1976 | Drebes | 201/40 |
| 3,976,666 | 8/1976 | Hoffmann et al. | 23/288 B |
| 3,992,266 | 11/1976 | Aktay et al. | 201/41 X |

*Primary Examiner*—Morris O. Wolk
*Assistant Examiner*—Michael S. Marcus

[57] ABSTRACT

Coal not normally used for coking is, prior to feeding to coking batteries, processed in a vertical suspension preheater heated by combustion gases from the coking batteries; the coal particles are separated from these combustion gases in two alternately operating sets of primary and secondary cyclone separators and are then supplied to coking batteries together with part of the combustion gases which serve as carrier gases for the coal particles.

4 Claims, 1 Drawing Figure

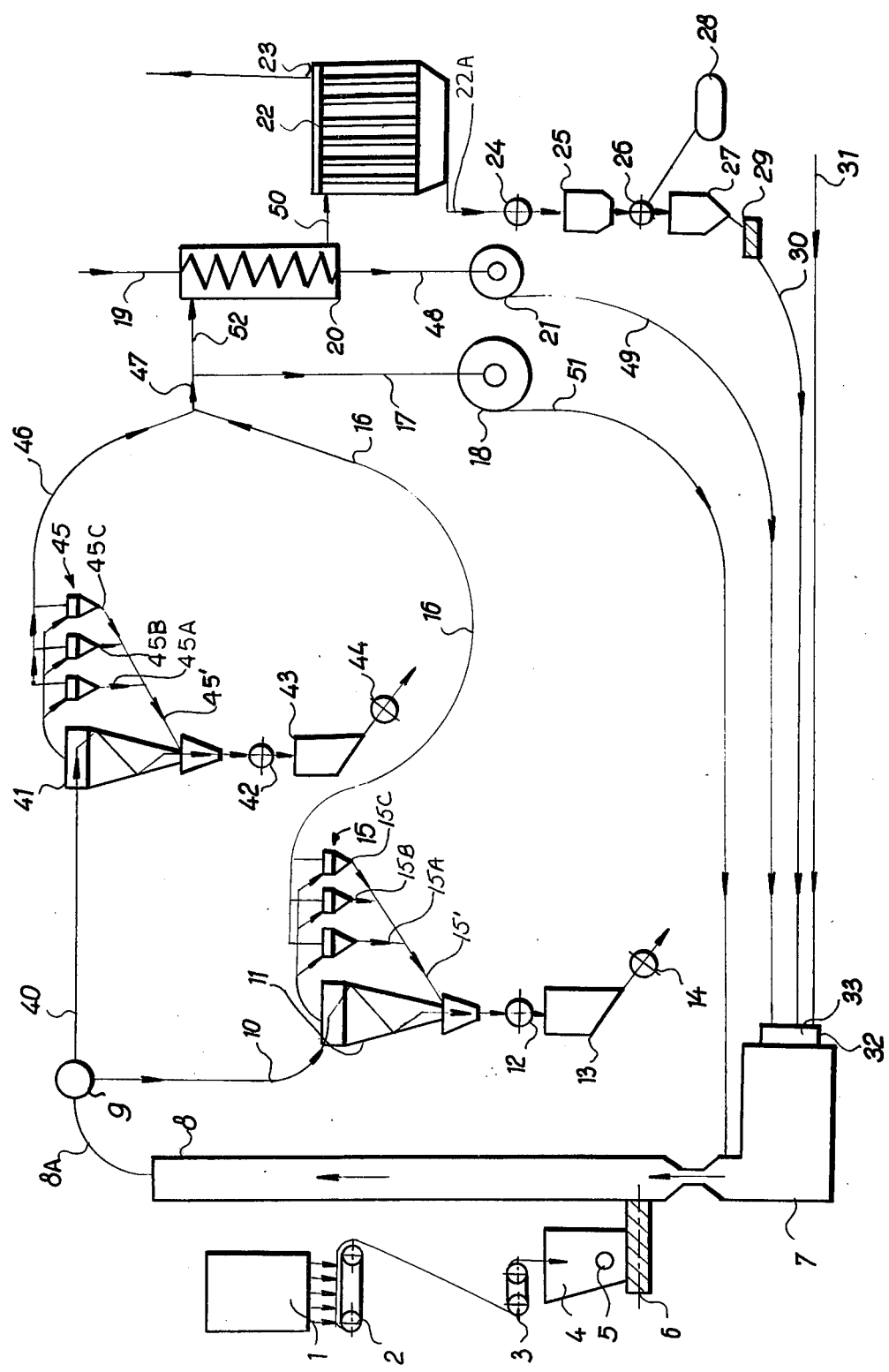

ARRANGEMENT FOR DOSING A COAL CHARGE TO A COKING BATTERY

BACKGROUND OF THE INVENTION

The invention relates to an arrangement for dosing a coal charge to a coking battery and to the utilization of this arrangement in coke plants.

The shortage of raw materials and in particular fossil fuels for generating power in the whole world have pointed to the necessity of applying in coke plants such processes which make it possible to produce blast furnace coke out of low quality coal normally not suitable for coking. As is well-known, there is a shortage of high grade cokable coal on the world markets, a situation which makes such coal relatively expensive. There is a trend in the development of blast furnaces to use hearths of larger and larger diameter requiring charges of coke with sufficiently favorable abrasivity and strength. Such a coke can be prepared from preheated coal having average coking properties. It is, however, equally necessary to satisfy requirements for the maintenance of a healthy ambient working atmosphere in the plant.

The actual state of the art includes several solutions for drying, preheating and dosing of coal charges. These solutions, however, do not meet all the requirements for a continuous operation without breakdowns. The prior art processes utilize a number of mechanical transport means for the preheated charge, including a main hopper and worm conveyors. The operation becomes, by virtue of these arrangements, rather complicated. To wit, breakdowns occur frequently, there are high labor requirements for the attendants, and the useful life of the arrangement is rather low.

In prior art arrangements which are presently in operation, the wet coal is conveyed from a charging hopper to a preheating column by means of a system of worm conveyors, whose speed is adjustable, which are remotely controlled from a control post of the preheater. The wet coal enters a quick-acting drying device where it contacts a stream of hot gas. The gas takes along the partly dried coal into a thinner phase of a fluid bed. A rotating mill is provided in the lower part of the fluid bed which quickly disperses and mixed coal particles in the gas stream and reduces the size of larger coal particles. The final size of coal particles is about ¼ inch and 90% thereof can pass through a sieve with ⅛ inch mesh. All preheated coal rises and 99% thereof is separated in a cyclone separator, the rest in smaller secondary cyclone separators. Coal, preheated to about 260° C, is conveyed to a distribution container and, by means of feeding means and a conveyor, is passed over to dosing storage bins. The gas is separated into two streams at the output from the secondary cyclone separators. The excess gas passes through a wet scrubber and is released to the atmosphere. The recirculation gas is compressed by a recirculation blower and is returned into the combustion chamber, where it is added in order to cool down the stream of combustion gases passing to the preheater. The required gas speed in the preheating column is obtained by automatic regulation of the recirculation stream of gas. Fine coal particles removed from the outgoing gas in the scrubber are taken away from the circuit of the circulating liquid as foam in a system of flotation containers. The foam is added to the foam from the flotation containers and the whole amount is dried in a vacuum filter. The filtrate is added to the wet coal in the feeding hopper.

SUMMARY OF THE INVENTION

It is an object of this invention to eliminate, or at least to mitigate, the drawbacks of the aforedescribed prior art arrangements and to provide an arrangement which would eliminate to a high degree the major sources of failure. It is another object of this invention to minimize the use of different mechanical conveying means which require much attendance and which are generally the most frequent causes for downtimes for the arrangement. The arrangement according to this invention comprises two sets of alternately operating primary cyclone separators followed by a number of secondary cyclone separators, both sets being arranged in parallel, whereby behind the lower outlet part of the primary cyclone separator a closure, connected to a dosing container for charging the coking battery, is provided. The upper part of the primary cyclone separator is connected to secondary cyclone separators which are connected in series to each other. The lower outputs of the secondary separators are conducted, via a conduit, by gravity into the lower part of the respective primary cyclone separator. The upper outputs of the secondary separators are connected, in a suspended condition, to a common conduit, to which common conduit the inlet of a pressure blower is connected. The pressure discharge conduit of the blower leads into the combustion chamber. The common conduit is furthermore connected by a conduit to a heat transmitter which is adapted to cool the remaining fine coal dust discharged into the atmosphere. Optionally, a filter with an output dosing conduit can be provided which is connected downstream to the heat transmitter and which leads to a burner for burning coal dust which is mounted in the combustion chamber.

An advantage of this arrangement of the invention resides in that, instead of the utilizing collecting storage bin for preheated coal and the distributors and conveyors leading therefrom to dosing containers (which generally form part of the prior art arrangement), two sets of alternately operating primary and secondary cyclone separators are used. For this purpose distributing means are provided at the outlet from the vertical suspension preheater, for the preheating medium with the coking mixture. These distributing means forward the preheated mixture alternately to one of two sets of primary and secondary cyclone separators.

Another advantage of the arrangement of the invention resides in that the coking mixture is conveyed with the preheating medium up to the cyclone separators and from there by gravity flow directly into the dosing containers. Thus any transport of the coking mixture by worm conveyors, rake conveyors, pocket feeders and similar devices is eliminated. Due to the elimination of mechanical transport means, the entire transporting is simplified and possible sources of failures and leakages, which cause frequently contaminations of the atmosphere by coal dust and toxic gases, are eliminated. The arrangement of the invention provides a completely closed circuit, which complies with all health and environmental protection standards.

The vertically arranged primary and secondary cyclone separators, closures and dosing containers make continuous-flow transport of the preheated coking mixture possible. This coking mixture is separated in the cyclone separators by gravity.

A further important advantage of the system of the invention resides in the dry separation and utilization of the residue of coal dust from the preheating medium in a filter. This dry, fine coal dust obtained from the filter, advantageously can be directly dosed to a burner for burning coal dust situated in the combustion chamber. The prior art systems generally use scrubbers for separating fine coal dust, for example, by flotation and a vacuum filter. Such systems are complicated and the additon of this coal dust back into the wet coking mixture is undesirable because it lowers the quality of the coke.

For normal conditions and application of a preheating unit of a capacity of 80 to 120 t/h, it is sufficient for only one dosing container to always be in operation, i.e. for one preheating unit, two alternately operating dosing containers are required. If, however, a preheating unit feeds chambers of smaller volume, it is possible to provide more dosing containers for instance, four.

Such an arrangement would be used only if it would not be possible to coordinate the filling cycle of the chambers with the transport facilities of the selected arrangement which transport the coking mixture from the container to the coking chambers.

DESCRIPTION OF THE DRAWING

The single FIGURE of the drawing schematically depicts an arrangement according to this invention for dosing a coal charge to a coking battery.

DESCRIPTION OF THE PREFERRED EMBODIMENT

The arrangement comprises a vertical suspension preheater 8 for the coking mixture. An outlet conduit 8A conducts the preheated fluid coking mixture from the upper part of the preheater 8 to a distributor 9. From this distributor 9 two conduits 10 and 40 conduct the mixture in a suspended condition to two alternately operating sets of primary cyclone separators 11 and 41. Secondary cyclone separators 15 and 45 are connected downstream of the primary cyclone separators 11 and 41 respectively. Both sets of cyclone separators are arranged in parallel.

A valve 12 and a valve 42 are respectively provided downstream of the outlet part of each primary cyclone separator 11 and 41. The valves 12 and 42 are adapted to selectively discharge into dosing containers 13 and 43, and valves 14 and 44 discharge such containers for filling the coking batteries. The upper part of each of the primary cyclone separators 11 and 41 is respectively connected to secondary cyclone separators 15 and 45, by means of an "in series connection". The respective lower outlets 15A, 15B, and 15C of secondary separators 15 are connected by a common conduit 15' which transports fluid by gravity flow to the lower part of the primary separator 11. Similarly the respective lower outlets 45A, 45B, 45C of the secondary separators are connected by a common conduit 45' which transports fluid by gravity flow to the lower part of the respective primary cyclone separators 11 and 41. The upper outlets from secondary cyclone separators 15 and 45 are respectively connected by conduits 16 and 46 for conducting fluid and coal dust in suspended condition to a common conduit 47. The suction conduit 17 of a pressure blower 18 is connected to conduit 47, its pressure output conduit 51 leading into the combustion chamber 7. A conduit 52 also connects conduit 47 with a heat transmitter 20 which serves to cool the residual dry and fine coal dust discharged into the atmosphere. A filter 22 has an outlet dosing conduit 22A in which a valve 24 is mounted. The conduit 22A leads to a container 25 and from there to a valve 26, a dosing container 27 for coal dust and a dosing device 29 for dosing this coal dust to the burner 32 which is mounted in the combustion chamber 7. The burner can also be joined to the heat transmitter 20 via conduit 49, blower 21 and conduit 48.

The arrangement of the invention operates as follows:

The wet coking mixture from a coal bunker or from a special storage bin 1 is conveyed by a conveyor band 2 by way of a weighing band or other device 3 of this kind to a feeding container 4. The feeding container 4 is provided with a known device 5 controlling the minimum and maximum content of the wet coking mixture therein. The wet coking mixture is conveyed by twin worm feeders 6 with continuous adjustment of the discharged amount from the feeding container 4 directly into the vertical suspension preheater 8. The wet coking mixture is first dried in the preheater 8 and subsequently is preheated to a suitable temperature (e.g. 180° to 280° C) and together with the preheating medium the coking mixture is taken along to the distributor 9. The distributor 9 alternately directs the preheated medium, taking along the preheated coking mixture either to the conduit 10 or the conduit 40. The conduit 10 or conduit 40 conducts the preheated coking mixture and the preheating fluid medium to a primary cyclone separator 11 or separator 41, where about 90% of the preheated coking mixture is separated. The coking mixture falls through the valve 12 or the valve 42 into the dosing container 13 or dosing container 43, in accordance with which one of the two sets of cyclones is in operation. The preheated fluid medium, with a residue of about 10% of preheated coking mixture, passes into the secondary cyclone separators 15 or 45 situated advantageously above the primary cyclone separator 11 or the cyclone separator 1. About 9% of the preheated coking mixture is separated in the secondary cyclone separator 15 or secondary cyclone separator 45 and passes respectively by gravity flow into the lower collecting part of the primary cyclone separator 11 or primary cyclone separator 41 and falls together with the preheated coking mixture from the primary cyclone separator 11 or primary cyclone separator 41 through the closure valve 12 or closure valve 42 into the dosing container 13 and the dosing container 43, respectively. If the dosing container 13 or the dosing container 43 is filled with the amount of preheated charge required for filling one coking chamber, the distributor 9 switches over the preheated flow medium with the preheated coking mixture from the preheater 8 to the second set of cyclone separators which has up to now been idle. The whole separating cycle is repeated in the second set.

One of both dosing containers 13 or 43 is thereby always ready to be emptied into a coking chamber and the second empty one is ready to receive the separated coking mixture.

The cycle of filling and emptying the dosing containers 13 and 43 is alternating and repeating.

The preheated flow medium streams, after leaving the cyclone separators into conduits 16 or 46, connected to the common conduit 47, which it reaches according to filling cycles of the dosing containers 13 and 43. The preheated medium free of oxygen is thus permanently in communication via branch conduits 10 or 40 of cyclone separators 11, 15, 41, 45, with the common conduit 47.

The preheated medium flow from conduit 47 is divided into two streams: one portion of the preheated flow medium is taken off by the suction conduit 17 leading to the pressure blower 18 and is forced via conduit 51 into the combustion chamber 7 for completion and cooling of combustion products and forming the required amount of preheated carrier medium.

The second portion of the preheated medium, which constitutes the residue, passes via conduit 52 to the heat transmitter 20, where it is subjected to controlled cooling above the dew point of water vapors. The residue of preheated flow medium passes from the heat transmitter 20 via a conduit 50 to a dry filter 22. In this dry filter 22 the preheated flow medium gets rid of about one percent of finest coal particles and the preheated flow medium, deprived of such dust, is then discharged into the atmosphere over stack 23.

The fine coal dust retained in the dry filter 22 passes, by way of the conduit 22A via the closure valve 24, into the container 25. The fine coal dust can be further transported by gravity flow over a distributor 26 of coal dust into a container 28 for tranport beyond the coking plant. It is, however, more advantageous and from the point of view of manipulation, simpler and safer to pass the coal dust from container 25, with closure valve 24 closed and a suitable adjusted open closure valve 26, into the dosing container 27 for coal dust.

The coal dust is transferred from the dosing container by means of the continuous dosing device 29 over conduit 30 to an auxiliarly burner 32 which burns powdered coal and is then transferred as an additional combustion medium into the combustion chamber 7.

Combustion gas, usually coking gas, or coking gas mixed with blast furnace gas, is supplied via conduit 31 to a main burner 33. Air required for burning is sucked in via conduit 19, passes through the heat transmitter 20 and is sucked into the heat transmitter 20 and is somewhat warmed by conduit 48, and is then transported into a pressure blower 21 and via conduit 49 supplied to main burner 33 and auxiliary burner 32.

Although the invention is illustrated and described with reference to a plurality of preferred embodiments, it is to be expressly understood that it is in no way limited by the disclosure of such preferred embodiments, but is capable of numerous modification within the scope of the appended claims.

I claim:

1. An arrangement for treating low-grade coal prior to feeding it to a coking battery, comprising in combination:
   a vertical suspension preheater vessel having a lower inlet means adapted for introducing preheated gas into the preheated vessel,
   combustion means connected to and in communication with the lower portion of said preheater vessel;
   means operatively connected to and communicating with the preheater vessel for supplying a coking mixture therein; te preheater vessel having an upper outlet means for removing the preheated gas and coking mixture suspended therein from the preheater vessel,
   distributor means connected to said upper outlet means of the preheater;
   two cyclone separator means, each of which has a primary cyclone separator and at least one secondary cyclone separator connected in series with its primary cyclone separator, the two cyclone separator means being connected in parallel to each other and being adapted to be alternately connected to said upper outlet means of said preheater vessel via said distributor means, each primary and secondary cyclone having an upper outlet means and a lower outlet means;
   two first valve means each of which is operatively connected to the lower outlet of a respective one of the primary cyclone separator of the two cyclone separator means;
   two dosing containers each in communication with a corresponding first valve means and adapted to receive a charge for feeding coking batteries;
   the upper outlet means of each primary cyclone separator being connected to and communicating with its secondary cyclone separator, the upper outlet means of all secondary cyclone separators of each cylcone separator means leading into a common first conduit;
   first gas blower means having a suction inlet means and a pressure outlet means, said suction inlet means being in communication with said common first conduit and said pressure outlet means being connected and in communication with said combustion means;
   combustion air preheating means having an inlet in communication with said common first conduit and an outlet in communication with said combustion means.

2. The arrangement as set forth in claim 1, comprising second blower means connected in series with the combustion air preheating means and delivering air to said means for introducing peheated gas into the combustion means.

3. The arrangement as set forth in claim 1, comprising dry filter means connected to and in communication with said combustion air preheating means, said filter means having a first gas outlet means and a second outlet means for coal dust.

4. The arrangement as set forth in claim 3, comprising means for feeding coal dust from the second outlet of the dry filter means to the combustion means.

* * * * *